United States Patent
Ashley et al.

(10) Patent No.: US 7,921,152 B2
(45) Date of Patent: Apr. 5, 2011

(54) METHOD AND SYSTEM FOR PROVIDING USER CONTROL OVER RECEIPT OF COOKIES FROM E-COMMERCE APPLICATIONS

(75) Inventors: Paul Anthony Ashley, Bardon (AU); Sridhar R. Muppidi, Austin, TX (US); Mark Vandenwauver, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 1144 days.

(21) Appl. No.: 10/621,934

(22) Filed: Jul. 17, 2003

(65) Prior Publication Data
US 2005/0015429 A1    Jan. 20, 2005

(51) Int. Cl.
*G06F 15/16* (2006.01)
(52) U.S. Cl. ........ 709/203; 709/200; 709/219; 709/225; 709/226; 709/229
(58) Field of Classification Search .................. 709/200, 709/203, 219, 225–226, 229
See application file for complete search history.

(56) References Cited

U.S. PATENT DOCUMENTS

| | | | | |
|---|---|---|---|---|
| 6,298,383 B1 | 10/2001 | Gutman et al. | ............... | 709/229 |
| 6,324,648 B1* | 11/2001 | Grantges, Jr. | .................. | 726/12 |
| 6,351,812 B1* | 2/2002 | Datar et al. | ................... | 713/182 |
| 6,360,270 B1 | 3/2002 | Cherkasova et al. | ......... | 709/229 |
| 6,401,125 B1 | 6/2002 | Makarios et al. | ............. | 709/229 |
| 6,754,825 B1* | 6/2004 | Lennie et al. | ................. | 713/181 |
| 6,888,942 B2* | 5/2005 | Crockett | ....................... | 380/200 |
| 6,948,074 B1* | 9/2005 | Borella et al. | .................. | 726/14 |
| 7,099,917 B2* | 8/2006 | Luna et al. | ..................... | 709/203 |
| 7,137,009 B1* | 11/2006 | Gordon et al. | ................ | 713/185 |
| 7,164,685 B2* | 1/2007 | Atamaniouk | ................. | 370/401 |
| 7,437,614 B2* | 10/2008 | Haswell et al. | ................. | 714/38 |
| 2001/0037292 A1 | 11/2001 | Vogt | ................................ | 705/39 |

(Continued)

FOREIGN PATENT DOCUMENTS
WO    WO 99/64967    12/1999
(Continued)

OTHER PUBLICATIONS

RFC2965—HTTP State Management Mechanism Network working group; Bell Laboratories, Lucent Technologies D.Kristol, L. Montulli; Oct. 2000.*

(Continued)

*Primary Examiner* — Duyen M Doan
*Assistant Examiner* — Tauqir Hussain
(74) *Attorney, Agent, or Firm* — Jeffrey S. LaBaw; David H. Judson

(57) ABSTRACT

A method, system, apparatus, and computer program product are presented for processing cookies that are transmitted from a server through a proxy server to a client that is operated by a user. The proxy server detects that a response message from the server for the client has an associated cookie. The proxy server extracts a domain identifier associated with the server from the response message, and the proxy server retrieves a set of parameters that contain domain identifiers that are associated with indications of whether to block transmission of cookies from servers associated with the domain identifiers. The proxy server then processes the cookie in the response message in accordance with the retrieved set of parameters and the extracted domain identifier, either blocking or not blocking cookies from the identified domain. Blocked cookies are cached for subsequent use. Multiple sets of parameters may be configured by the user.

26 Claims, 5 Drawing Sheets

U.S. PATENT DOCUMENTS

| | | | | |
|---|---|---|---|---|
| 2001/0037407 | A1* | 11/2001 | Dragulev et al. | 709/250 |
| 2001/0054155 | A1* | 12/2001 | Hagan et al. | 713/193 |
| 2002/0003903 | A1* | 1/2002 | Engeldrum et al. | 382/233 |
| 2002/0007393 | A1 | 1/2002 | Hamel | 709/203 |
| 2002/0023123 | A1* | 2/2002 | Madison | 709/203 |
| 2002/0041287 | A1* | 4/2002 | Engeldrum et al. | 345/589 |
| 2002/0078192 | A1* | 6/2002 | Kopsell et al. | 709/223 |
| 2002/0080168 | A1* | 6/2002 | Hilliard et al. | 345/744 |
| 2002/0112155 | A1* | 8/2002 | Martherus et al. | 713/155 |
| 2002/0178381 | A1* | 11/2002 | Lee et al. | 713/201 |
| 2002/0184338 | A1* | 12/2002 | Haines et al. | 709/218 |
| 2003/0005308 | A1* | 1/2003 | Rathbun et al. | 713/185 |
| 2003/0084300 | A1* | 5/2003 | Koike | 713/182 |
| 2003/0172090 | A1* | 9/2003 | Asunmaa et al. | 707/200 |
| 2003/0177196 | A1* | 9/2003 | Bhasin et al. | 709/213 |
| 2003/0193899 | A1* | 10/2003 | Wang | 370/252 |
| 2003/0197722 | A1* | 10/2003 | Sugauchi et al. | 345/736 |
| 2004/0103310 | A1* | 5/2004 | Sobel et al. | 713/201 |
| 2004/0205149 | A1* | 10/2004 | Dillon et al. | 709/217 |
| 2004/0205182 | A1* | 10/2004 | Geddes | 709/223 |
| 2004/0243648 | A1* | 12/2004 | Hidaka et al. | 707/200 |
| 2005/0025071 | A1* | 2/2005 | Miyake et al. | 370/254 |
| 2005/0039132 | A1* | 2/2005 | Germain et al. | 715/736 |
| 2005/0240490 | A1* | 10/2005 | Mackey | 705/26 |
| 2009/0199000 | A1* | 8/2009 | Hsu et al. | 713/162 |

FOREIGN PATENT DOCUMENTS

| | | | |
|---|---|---|---|
| WO | WO 9964967 | * | 12/1999 |
| WO | WO 01/77780 | A1 | 10/2001 |
| WO | WO 0203291 | A1 * | 1/2002 |

OTHER PUBLICATIONS

A recipe for cookie management; Integrate an easy-to-use library for client-side cookie handling by Sonal Bansal, JavaWorld.com, Apr. 26, 2002 http://www.javaworld.com/javaworld/jw-04-2002//jw-0426-cookie.html?page=2.*

"How are you different from Anonymizer?", http://www.freedom.net/support/article.html, Article 428, Nov. 27, 2001.

"Anonymizer Total Net Shield", http://www.anonymizer.com, Jan. 2002.

"Anonymizer Private Surfing 2.1", http://www.anonymizer.com Jan. 2002.

"Prevent Online Tracking and Spam", http://www.anonymizer.com, Jan. 2002.

"Defense Against Web Threats", http://www.anonymizer.com, Jan. 2002.

"Enabling Cookies", http://webmaster.info.aol/cookieguide.html, Jan. 2002.

Forristal, "AppScan Flags Security Problems in Web Applications", *Network Computing*, v. 11, n. 20, Oct. 16, 2000.

Berghel, "Hijacking the Web", *Comm. of the ACM*, v. 45, n. 4, pp. 23-27, Apr. 2002.

Kristol, "HTTP Cookies: Standards, Privacy, and Politics", *ACM Transactions on Internet Technology*, v. 1, n. 2, pp. 151-198, Nov. 2001.

Rosenstein, "What is Actually Taking Place on Web Sites: E-Commerce Lessons from Web Server Logs", *ACM Conf. on Electric Commerce (EC '00)*, pp. 38-43, Oct. 2000.

Felten et al., "Timing Attacks on Web Privacy", *7th ACM Conf. in Computer and Communication Security* 2000, pp. 25-32, Nov. 2000.

Chrungoo et al., "Smart Proxy: Reducing Latency for HTTP Based Web Transfers Across Satellite Links", 2000 *IEEE Intl. Conf. on Personal Wireless Comm.*, pp. 572-576, Dec. 17, 2000.

Eden et al., "Web Latency Reduction Via Client-Side Prefetching", 2000 *IEEE Intl. Symposium on Performance Analysis of Systems and Software*, pp. 193-200, Apr. 2000.

Shahabi et al., "Knowledge Discovery from Users Web-Page Navigation", *7th Intl. Workshop on Research Issues in Data Engineering*, pp. 20-29, Apr. 1997.

Iyengar, "Dynamic Argument Embedding: Preserving State on the World Wide Web", *IEEE Internet Computing*, v. 1, n. 2, pp. 50-56, Mar. 1997.

* cited by examiner

*FIG. 3A*

ANONYMOUS PRIVACY SERVICE  
300  
USERNAME: jsmith ~ 302  
PASSWORD: ******** ~ 304  
CLIENT TYPE: laptop ~ 306  
LOGIN

*FIG. 3B*

ANONYMOUS PRIVACY SERVICE  
310  
USERNAME: jsmith  
PASSWORD: ********  
LOCATION: office ~ 312  
LOGIN

*FIG. 4A*

ANONYMOUS PRIVACY SERVICE  
SELECT DEVICE LOCATION  400  
OFFICE ▼ ~ 402  
CANCEL

*FIG. 4B*

ANONYMOUS PRIVACY SERVICE  
MANAGE DEVICE LOCATIONS  410  
OK  
CURRENT DEVICE LOCATIONS  
OFFICE ▼ ~ 412  
CANCEL  
ADD ... ~ 414  DELETE ... ~ 416  RENAME ... ~ 418

*FIG. 4C*

ANONYMOUS PRIVACY SERVICE  
COOKIE ALERT!  420  
IBM.COM IS ATTEMPTING TO SET A COOKIE ON YOUR COMPUTER. DO YOU WANT TO ALLOW IBM.COM TO SET A COOKIE?  
○ CURRENT LOCATION ~ 422  
○ ALL LOCATIONS ~ 424  
○ SELECT LOCATION ~ 426  
OFFICE ▼ ~ 428  
NO  
YES

METHOD AND SYSTEM FOR PROVIDING USER CONTROL OVER RECEIPT OF COOKIES FROM E-COMMERCE APPLICATIONS

BACKGROUND OF THE INVENTION

1. Field of the Invention

The present invention relates to an improved data processing system and, in particular, to a method and apparatus for configuring an operator interface. Still more particularly, the present invention provides a method and apparatus for customizing a multicomputer data transfer associated with cookies.

2. Description of Related Art

Privacy has been defined as the right of individuals to determine for themselves when, how, and to what extent information about them is communicated to others. Privacy is considered to be an important individual right, and many users of the Internet are aware of privacy rights and related issues.

Although privacy issues have become important concerns of reputable web sites and successful e-commerce companies, many Internet e-commerce sites violate user privacy by collecting user information and then selling it or using it in ways that were not agreed upon by the user. As the amount of e-commerce increases, it is expected that the number of privacy violations will continue to increase.

One method that e-commerce sites are using to gather user information involves the use of cookies, e.g., HTTP cookies (HyperText Transport Protocol). Cookies can be used to gather information about a user's action within a web site or for other purposes. This information is often collected and used without the knowledge or consent of the user of a web site.

Many governmental entities have considered regulating the use of cookies. For example, an e-commerce site might be forbidden to send cookies to a user unless there is full disclosure to the user about the purpose of each cookie. In that case, the e-commerce site would need to drastically reduce or completely eliminate their use of cookies.

However, cookies do serve some useful purposes that do not involve a violation of a user's privacy. For example, some of the basic communication protocols for the World Wide Web were originally designed as stateless protocols. Hence, if a web site were to use only these basic communication protocols, it would be difficult for the web site to provide an interesting experience to a user of the web site, e.g., web pages that have been customized for a particular user based on the user's actions with respect to the web site or movement within the web site. In contrast, cookies allow a web site to maintain state information about a user. In other words, cookies are a good way to keep track of a user session while the user is accessing an e-commerce application. For example, a common use of cookies on e-commerce web sites is an electronic shopping cart feature that assists a user in selecting products for purchase.

There have been some attempts to empower users with control over the use of cookies. For example, many web browsers allow a user to determine certain conditions for accepting cookies. The user of a browser application may enable and disable cookies, and in some instances, the user can request that the browser prompt the user before accepting a cookie, thereby alerting the user to the fact that a web site is attempting to set a cookie on the user's client device. However, if the browser blocks the setting of a cookie on a user's client device, then the web site may return an error message that states that the web site cannot be properly viewed because the user has disabled the use of cookies, thereby denying certain functionality within the web site to the user.

As another example of user control over cookies, a user may employ a privacy service on the World Wide Web that acts as an intermediary for all of the data traffic to and from the user's client device, thereby allowing the privacy service to filter the user's data traffic and to perform certain privacy-enhancing functions on the user's data traffic. One of the privacy-enhancing functions of the privacy service may include blocking the transfer of cookies from a web site to a user's client device by caching cookies at an intermediate server, which then returns the cookies to the appropriate web site as necessary based on the requests that are sent from the client device through the intermediate server. However, these privacy services merely allow the user to switch on and off the cookie blocking/caching functionality. There may be occasions or environments in which a user may want more flexibility in the user's control over these types of privacy services than the mere ability to cache cookies at the intermediate server.

Therefore, it would be advantageous to have a method and a system that provides flexibility to a user such that the user has a finer granularity of control over cookie filtering capabilities.

SUMMARY OF THE INVENTION

A method, system, apparatus, and computer program product are presented for processing cookies that are transmitted from a server through a proxy server to a client that is operated by a user. The proxy server detects that a response message from the server for the client has an associated cookie. The proxy server extracts a domain identifier associated with the server from the response message, and the proxy server retrieves a set of parameters that contain domain identifiers that are associated with indications of whether to block transmission of cookies from servers associated with the domain identifiers. The proxy server then processes the cookie in the response message in accordance with the retrieved set of parameters and the extracted domain identifier, either blocking or not blocking cookies from the identified domain. Blocked cookies are cached for subsequent use. Multiple sets of parameters may be configured by the user.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIGS. 3A and 3B depict graphical user interface windows for authentication operations in which a user is able to select a client profile for a privacy service in accordance with an embodiment of the present invention;

FIGS. 4A-4C depict graphical user interface windows for providing user-configurability over client profiles and other parameters that are used by the processing of the privacy service in accordance with the present invention;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
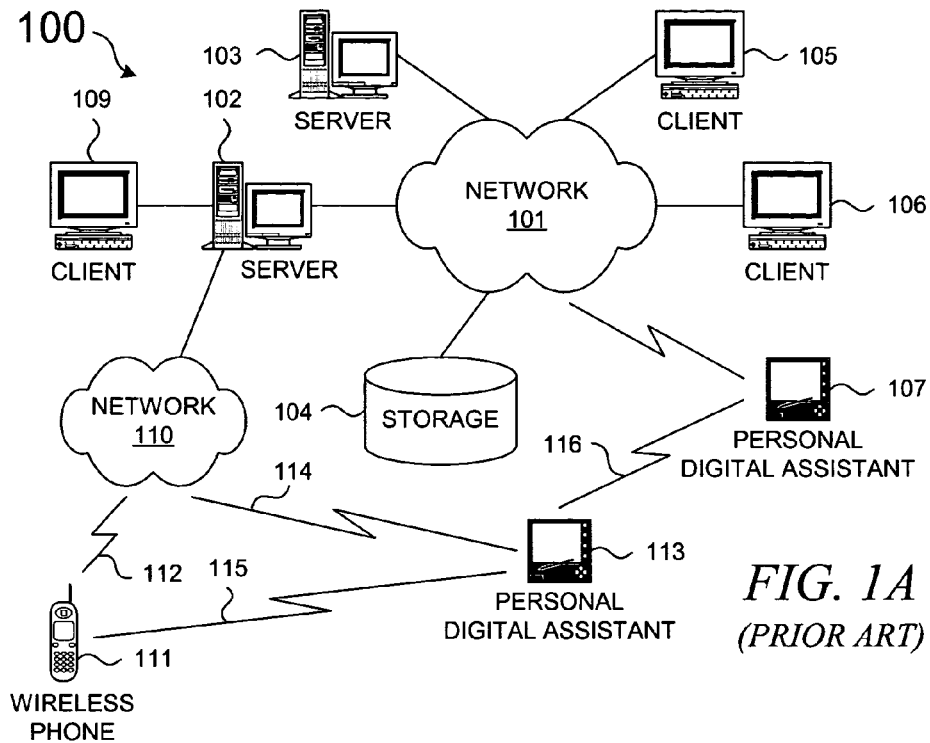
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
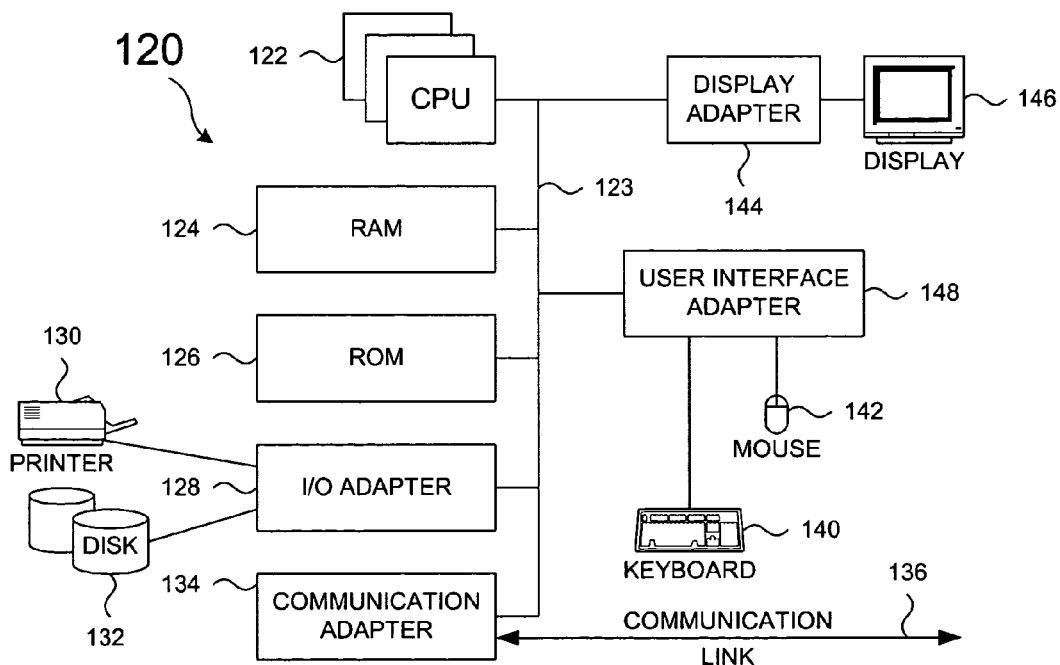
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The descriptions of the figures herein involve certain actions by either a client device or a user of the client device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" can be used interchangeably without significantly affecting the meaning of the described processes.

The present invention may be implemented on a variety of hardware and software platforms, as described above with respect to FIG. 1A and FIG. 1B. More specifically, though, the present invention is directed to an improved privacy service. Prior to describing the improved privacy service in more detail, a typical privacy service is described.

When a user accesses a typical web site by using a web browser application to send a request to the web site, a server may return a cookie with its response to the request, and the browser application stores the cookie in its cookie cache along with an associated indication of the source domain from which the cookie had originated. If the user accesses the source domain at some later point in time, the browser will forward the previously received cookie along with the new request to the server. In this manner, the web server can maintain state information about the user through the use of information that is placed within a cookie, such as a session identifier, even if the communication protocol is basically a stateless protocol. The cookie cache may simultaneously store multiple cookies, thereby assisting multiple web servers to maintain multiple simultaneous sessions.

Figure 1C:
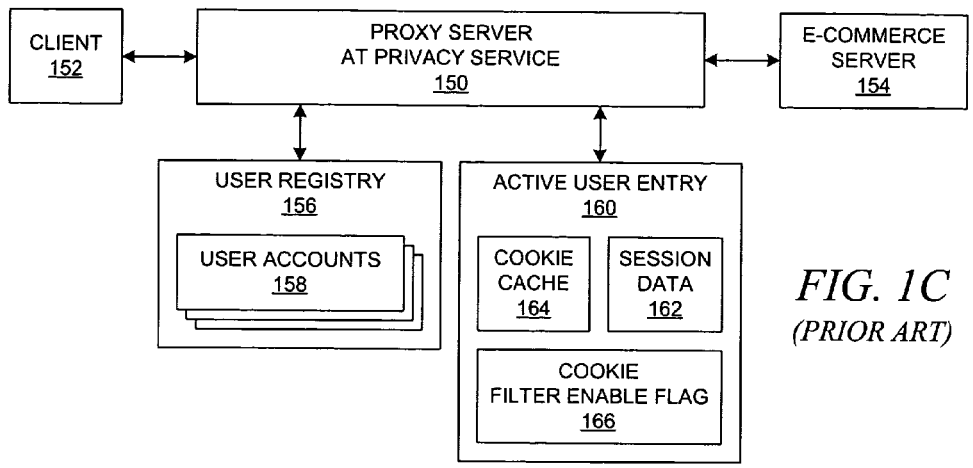
FIG. 1C depicts a block diagram that shows a typical privacy service that acts as an intermediate agent within a network between a typical client and a typical server.

With reference now to FIG. 1C, a block diagram depicts a typical privacy service that acts as an intermediate agent within a network between a typical client and a typical server. In a manner that is similar to commercially available privacy services, proxy server 150 is supported by a privacy service. Proxy server 150 operates within a network, such as network 101 shown in FIG. 1A, to process the data traffic between client 152 and one or more servers, such as e-commerce server 154; client 152 and server 154 are representative of typical clients and servers in a generalized networked environment as shown in FIG. 1A.

The privacy service maintains user registry 156 containing multiple user accounts 158. A user registers with the privacy service, possibly by agreeing to a subscription fee for the service. After a user account is established, the user may login to the privacy service through some form of authentication operation, and the privacy service creates active user entry 160 in an appropriate database or data structure and maintains an active session for the user; each unique user has a unique active user entry. Any subsequent data traffic from the user's client device will be recognized as originating from a registered user with an active session, and the privacy service will perform certain processing on the user's data traffic while the session is active. User datastreams can be tracked through the use of SSL (Secure Socket Layer) sessions or through URL (Uniform Resource Locator) rewriting. Proxy server 150 maintains session data 162 for the user, and the session data includes user-specific cookie cache 164. The privacy service may allow a user to disable cookie filtering while maintaining an active session for various other types of privacy-enhancing functions; hence, the privacy service may maintain cookie filter enable flag 166 that indicates whether the cookie filtering functionality of the privacy service is enabled or disabled.

The privacy service enhances the privacy of the user by trapping cookies at an intermediate server, which caches cookies and blocks them from being transmitted to the client. At some later point in time, the intermediate server attaches the appropriate cookies to outgoing requests that are sent from the client through the intermediate server to a server in a domain that is associated with the cookie, thereby allowing a user to access various web sites or e-commerce applications with the full functionality that is provided by the web servers or the e-commerce applications. In this manner, the client operates without storing insecure cookies in a cookie cache at the client, and the server is not able to associate other information about the client, such as a source IP address, with the cookie. Hence, the user is able to access web sites in a more anonymous manner.

Figure 2:
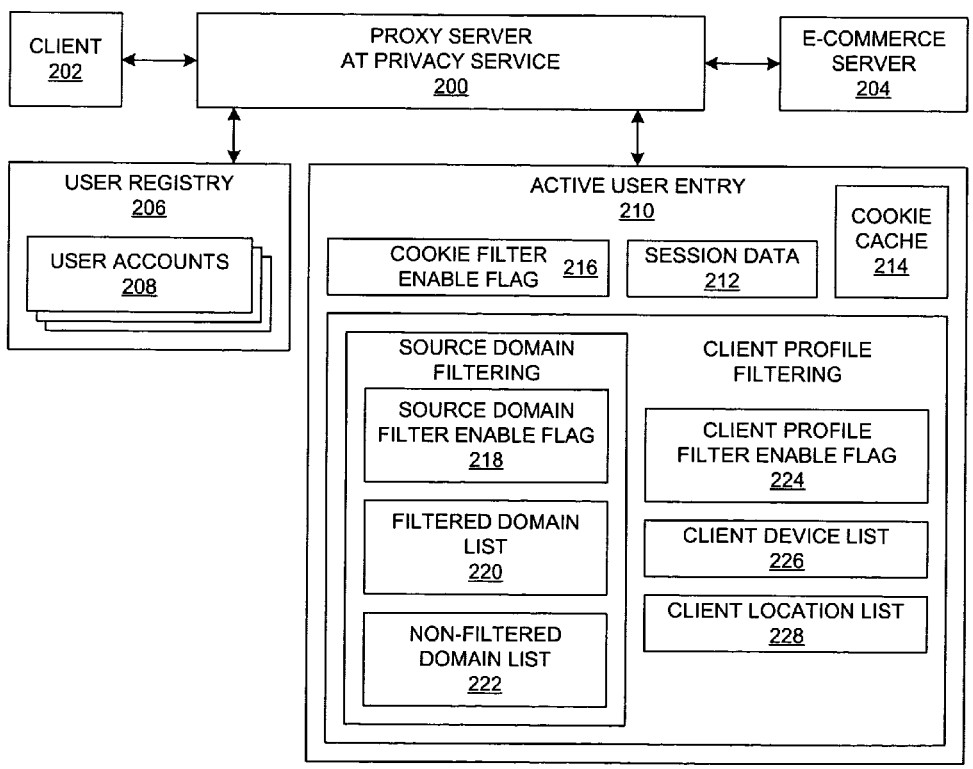
FIG. 2 depicts a block diagram that shows a privacy service that includes additional functionality for supporting user configurable options with respect to cookie filtering within the privacy service in accordance with the present invention.

With reference now to FIG. 2, a block diagram depicts a privacy service that includes additional functionality for supporting user configurable options with respect to cookie filtering within the privacy service in accordance with the present invention. In a manner similar to privacy service 150 that is shown in FIG. 1C, privacy service 200 acts as an intermediate agent between client 202 and server 204; client 202 and server 204 are operating within a distributed data processing system such as the system that is described above with respect to FIG. 1A. The privacy service maintains user registry 206 containing multiple user accounts 208; an active session for a previously authenticated user is processed in accordance with an active user entry 210 in an appropriate database or data structure. Proxy server 200 maintains session data 212 for the user, and the session data includes user-specific cookie cache 214. The privacy service may maintain cookie filter enable flag 216 that indicates whether the cookie filtering functionality of the privacy service is enabled or disabled; the cookie filter enable flag may be temporarily stored as part of the user's session data, or the cookie filter enable flag may be persistently stored as part of the user's account data each time that it is changed.

In contrast to privacy service 150 in FIG. 1C, privacy service 200 in FIG. 2 supports user-configurability of cookie filtering for each particular domain that the user accesses. Source domain filtering enable flag 218 indicates whether the user has chosen to filter cookies on an individual domain basis. For each domain that returns a cookie, i.e. source domain, the privacy service determines whether the source domain is contained within filtered domain list 220 or within non-filtered domain list 222. As explained in more detail further below, if the source domain is contained in either list, then the privacy service processes a cookie in accordance with the user-configured parameters in one of the lists; otherwise, the privacy service may prompt the user for an appropriate action.

As an alternative to the source domain filtering functionality or in conjunction with the source domain filtering functionality, the privacy service may also allow a user to filter cookies in accordance with a user-configurable indication of a client profile, e.g., a type of client device or a location for a client device. Client profile filter enable flag 224 indicates whether the user has chosen to filter cookies based on parameters that are associated with a client profile, e.g., a device type or a client location as currently selected by a user from client device list 226 or client location list 228. For example, the source domain filtering functionality might be enabled or disabled based on a particular client location which has been previously chosen by the user; each client location may have its own filtered domain list and non-filtered domain list, thereby tailoring the privacy enhancing functionality of the privacy service based on the user's indicated client location, as explained in more detail further below.

It should be noted that the examples of the present invention hereinbelow describe a client profile as a type of client device or a location of a client device. However, a client profile may comprise a variety of operational characteristics for the current computational environment from which the user is operating a client device and employing the privacy enhancing functionality of the present invention. For example, a client profile may have a temporal characteristic or a characteristic based on the user's current purpose for invoking the present invention, e.g., financial-related activities versus news-perusal activities.

The privacy enhancing functionality of the present invention may be implemented at any intermediate server between any client device that is being operated by a user and any target server at which the user is attempting to access resources. It should be noted that although the present invention may be implemented within a privacy service, which may offer other privacy enhancing functions and may act as an independent third party, the present invention may also be implemented in conjunction with other services.

With reference now to FIGS. 3A and 3B, diagrams depict graphical user interface windows for authentication operations in which a user is able to select a client profile for a privacy service in accordance with an embodiment of the present invention. Referring to FIG. 3A, window 300 is similar to windows or web pages that are used during typical authentication operation to prompt a user to enter a username and password combination in username text entry field 302 and password text entry field 304. Upon validation by an authentication procedure at a server of the username and password combination, the server initiates an active session for the authenticated user.

In contrast to a typical authentication procedure by a privacy service, an embodiment of the present invention allows a user to select a client profile during the logon or authentication procedure. Text entry field 306 allows a user to enter a name or an identifier for a client profile that was previously created or configured by the user; the contents of text entry field 306 would be transmitted together with the username and password to a server at the privacy service. Assuming the user is successfully authenticated, then the privacy service processes cookies within the user's datastream in accordance with the client profile that the user has selected during the authentication operation. The selection of a client profile may be optional; if the user does not select a client profile, then the privacy service may use a set of default parameters.

The type of client profile that may be selected by the user during a login operation may vary with implementations of the present invention. In the example that is shown in FIG. 3A, the privacy service has provided text entry field 306 as a mechanism for the user to select a client profile that is associated with a type of client device. Referring to FIG. 3B, window 310 in FIG. 3B is similar to window 300 in FIG. 3A, but text entry field 312 in window 310 allows a user to select a client profile that is associated with a location of a client device. In yet another embodiment, the user may be provided with a text entry field that allows the user to select a generic client profile in which the type of client profile is not predetermined by the privacy service but instead is determined by the user.

The examples in the figures herein depict various forms of graphical user interface (GUI) windows. One having ordinary skill in the art would understand that the functionality that is depicted within these windows may be implemented through a variety of GUI controls, including the use of web pages with embedded controls, buttons, menus, etc. . . .

With reference to FIGS. 4A-4C, a set of diagrams depict graphical user interface windows for providing user-configurability over client profiles and other parameters that are used by the processing of the privacy service in accordance with the present invention. Referring to FIG. 4A, window 400 allows a user to switch between different pre-configured client profiles through the use of drop-down menu 402. It may be assumed that the user has previously selected a client profile during a logon operation, and window 400 (or a web page with similar functionality) allows a user to change from one client profile to a different client profile. Alternatively, the privacy service may not allow a user to select a client profile during a logon operation, and window 400 may be presented to the user immediately after the logon operation so that the user may choose a client profile at that time.

Referring to FIG. 4B, window 410 allows a user to manage the user's client profiles. Drop-down menu 412 allows a user to choose a client profile to be managed. Add button 414 allows a user to add a new client profile, while delete button 416 allows a user to delete a client profile and rename button 418 allows a user to rename a client profile. Selection of OK button 419 may open a different window that allows the user to modify parameters that are used by the privacy service, e.g., to add, delete, or modify domain names in a filtered domain list or a non-filtered domain list.

Referring to FIG. 4C, window 420 is presented to a user after the privacy service has detected a cookie in the datastream that is being returned from a server to the user's client device, e.g., a cookie that is attached to a response message from the server, such as an HTTP cookie within a header of an HTTP response message. Window 420 prompts the user to decide whether the privacy service should allow the cookie to be set on the client device or whether the privacy service should block the cookie from being transmitted to the client, e.g., by modifying an HTTP response message to remove the cookie header, thereafter caching the cookie for subsequent use. In a preferred embodiment, the privacy service stores the user indication. If the privacy service does not implement client profiles, then the user indication may be saved by the privacy service as a default parameter that is used when processing each cookie that is subsequently received from the associated domain. If the user desires to change the user's indication of allowing the cookie with respect to a particular domain, the user may invoke window 410 that allows the user to modify the processing parameters or permissions.

In addition, the privacy service may also allow the user to select one or more client profiles with which the user indication is to be associated. For example, the user should answer "yes" or "no" about whether to allow a cookie from a particular domain that has returned a cookie. Thereafter, the user's decision with respect to that particular domain may be stored: in association with the client profile that is currently active, e.g., as selected through button 422, which indicates "current location" because the client profiles are tailored to client locations in the exemplary embodiment; in association with all of the user's client profiles, e.g., as selected through button 424, which indicates "all locations", i.e. all client locations; or one of the user's client profiles, e.g., as selected through button 426, which indicates that the user has chosen a previously configured location that has been selected within dropdown menu 428.

Figure 5:
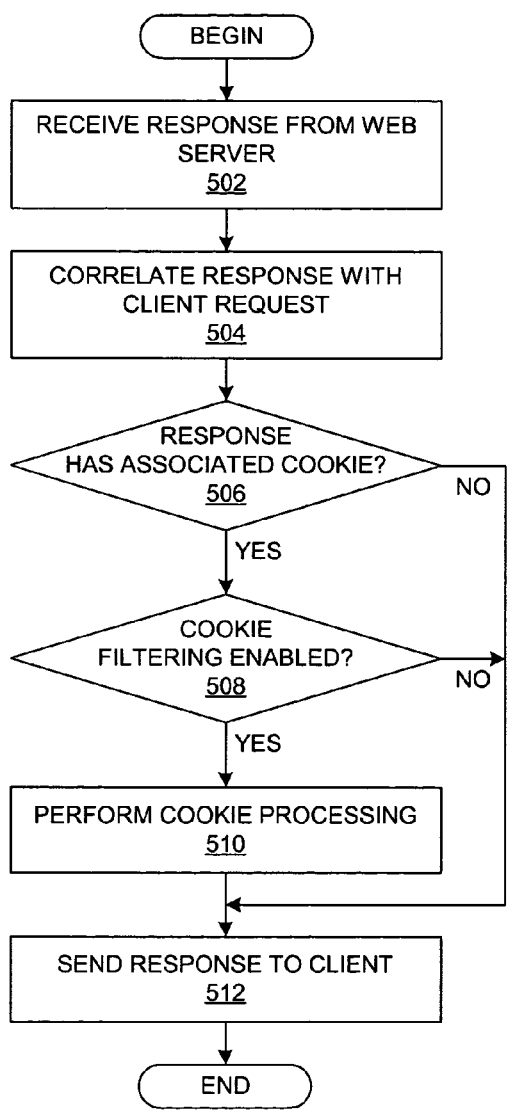
FIG. 5 depicts a flowchart that shows a process in a typical privacy service for filtering a user's datastream to block cookies in accordance with an enable/disable flag.

With reference now to FIG. 5, a flowchart depicts a process in a typical privacy service for filtering a user's datastream to block cookies in accordance with an enable/disable flag. The process begins when the privacy service receives a response from a web server or other type of server (step 502), and the server response is correlated with a particular client request (step 504), e.g., by using information that has been embedded within a URL by the privacy service, which is able to "rewrite" hypertext links within web pages that previously passed through the privacy service to the client. A check is made to determine whether the response has an associated cookie (step 506), and if so, then a check is made to determine whether the cookie filtering flag is set (cookie filtering enabled) (step 508). If so, then the privacy service performs the appropriate cookie processing (step 510), such as caching the cookie for the user and removing or detaching the cookie from the response message. The modified response message is then sent to the client (step 512), and the process is concluded. If the response did not have an associated cookie as determined at step 506 or the cookie filtering flag was cleared (cookie filtering disabled) as determined at step 508, then the response message would be sent to the client without modification at step 512, and the process would be concluded.

Figure 6B:
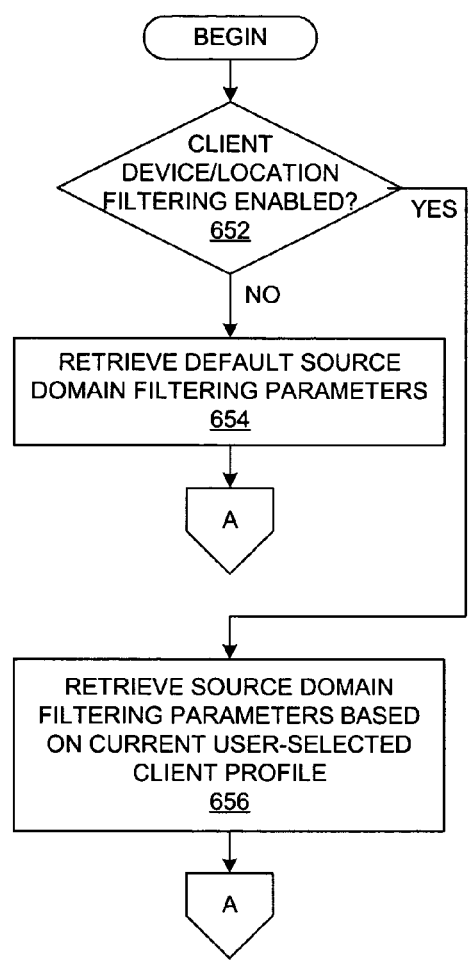
FIGS. 6A and 6B depict a pair of flowcharts that show processes at a privacy service or some type of similar privacy proxy for filtering cookies in accordance with user-configured parameters.
Figure 6A:
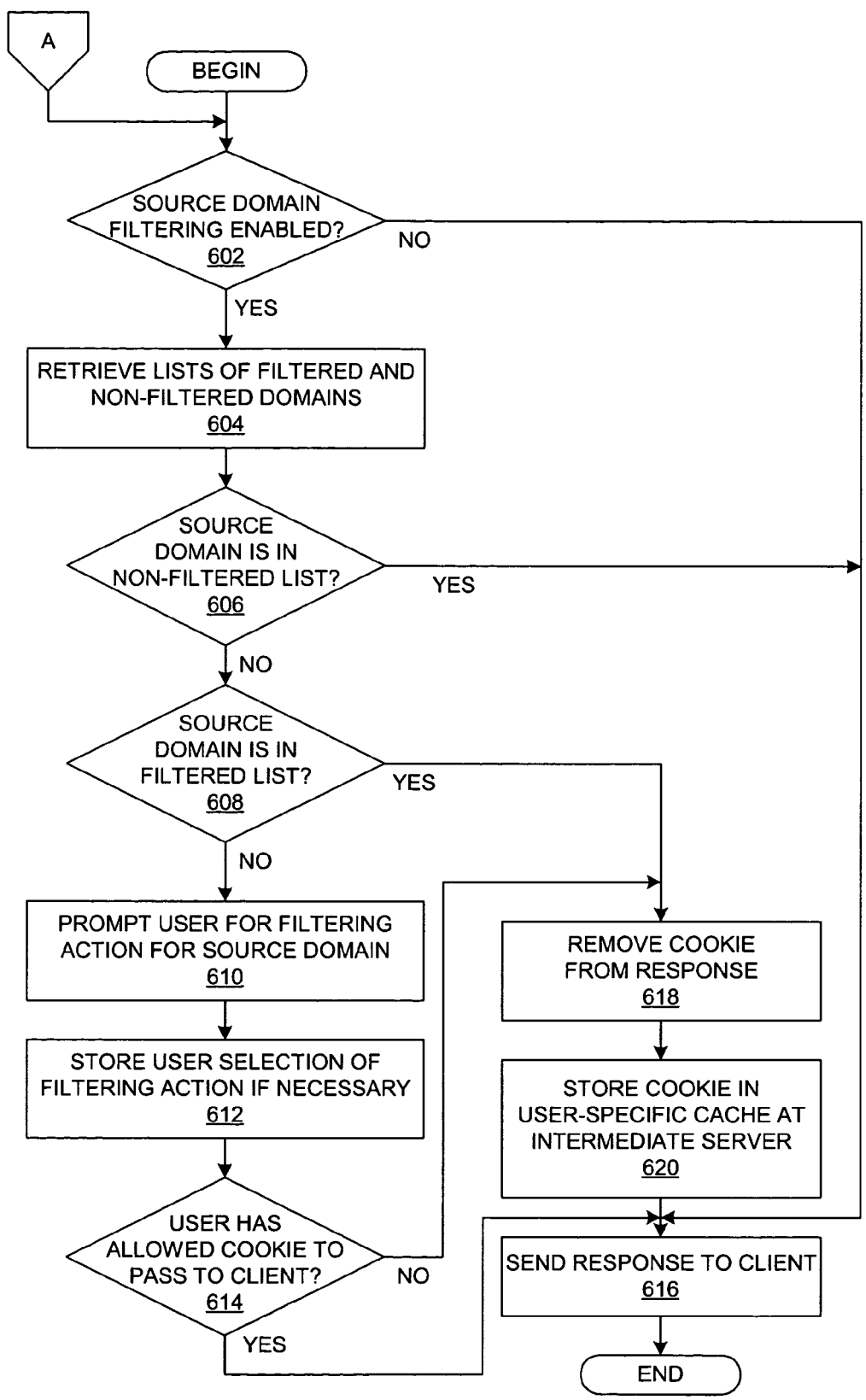

With reference to FIGS. 6A and 6B, a pair of flowcharts depict processes at a privacy service or some type of similar privacy proxy for filtering cookies in accordance with user-configured parameters. The processes that are shown in FIGS. 6A and 6B may be regarded as providing further detail for steps 510 and 512 that are shown in FIG. 5. In other words, the processes that are shown in FIGS. 6A and 6B depict an embodiment in which the functionality of the present invention has been added to a typical privacy service to extend its functionality to include the present invention.

Referring now to FIG. 6A, the depicted process assumes that a server response with an associated cookie has already been received, and a determination has been made to process the associated cookie to some greater extent, e.g., because a cookie filtering flag indicates that the user has enabled the cookie filtering functions. The process begins with a determination of whether or not the user has enabled source domain filtering (step 602). In this particular embodiment, the privacy service provides user-configurability of source domain filtering with client profile filtering. If the user has not enabled source domain filtering, then the response is not modified, and the process branches to forward the response to the client, thereby concluding the process.

If the user has enabled source domain filtering, then the lists of filtered domains and non-filtered domains are retrieved (step 604), and a determination is made as to whether the source domain of the response that is currently being processed is included in the non-filtered domain list (step 606). If the source of the response is included in the non-filtered domain list, then the response is not modified, and the process branches to forward the response to the client, thereby concluding the process. If the source domain of the response is not included in the non-filtered domain list, then a determination is made as to whether or not the source domain is included in the filtered domain list (step 608).

If the source domain of the response is not included in the filtered domain list, then it has been determined that the source domain is not included in either the filtered domain list or the non-filtered domain list. Hence, the privacy service has not previously stored a user-selected preference as to whether or not cookies from this particular source domain should be blocked from a client device and cached at the privacy service or permitted to pass through the privacy service to the user's client device. In light of this, the privacy service prompts the user to select a filtering or non-filtering action with respect to the source domain (step 610). Assuming that the privacy service can store the user selection in a persistent manner on a per-user basis, then the privacy service stores the user's response to the prompt (step 612); in this manner, the user selection is available as a user-configured parameter during the user's subsequent sessions. If the user has selected an option to allow the cookie through the privacy service to the client device (step 614), then the privacy service sends the response to the client without removing or detaching the cookie from the response (step 616), and the process is concluded.

If it is determined at step 614 that the user has selected an option not to allow the cookie through the privacy service to the client device for this particular source domain, then the privacy service removes or detaches the cookie from the response (step 618), and the cookie is cached in a user-specific cache by the privacy service (step 620). The modified response is then forwarded to the client at step 616, and the process is concluded.

Reviewing the other possible outcome of the determination at step 608, if the source domain is included in the filtered domain list, then the user has already indicated during the processing of a previous response that the privacy service should block cookies from the source domain. The process would then branch to steps 618 and 620 to cache the cookie before returning a modified response to the client, thereby concluding the process.

As mentioned above, a given implementation of the present invention may incorporate source domain filtering, client profile filtering, or a combination of both types of filtering operations. FIG. 6A shows a process in which only source domain filtering is operational, while FIG. 6B shows a process or sub-process for incorporating client profile filtering in combination with source domain filtering. In contrast to the process that is shown in FIG. 6A, which supports only one list of filtered domains and one list of non-filtered domains for a given user, FIG. 6B shows a process in which a privacy service supports multiple client profiles per user, thereby allowing a user to have a set of lists for each client profile.

Referring now to FIG. 6B, a determination is made as to whether or not the user has enabled client profile filtering of cookies at the privacy service (step 652). If not, then a default set of source domain filtering parameters is retrieved (step 654), and the process branches to step 602 in FIG. 6A. If the user has enabled client profile filtering, then a particular client profile has been selected as an active client profile, e.g., through window 400 in FIG. 4A. The source domain filtering parameters that are associated with the current client profile are retrieved (step 652), which may include a source domain filter enable flag as shown in FIG. 2, and the process branches to step 602 in FIG. 6A, thereby concluding the portion of the process that is shown in FIG. 6B; after branching, at step 604 in FIG. 6A, the lists of filtered and non-filtered domain that would be retrieved are associated with the currently active client profile as provided at step 652.

The advantages of the present invention should be apparent in view of the detailed description that is provided above. With a typical privacy proxy server or privacy service, cookies are either filtered or not filtered based on a selection by a user.

However, if the user is very mobile and uses many different client devices, there may be occasions or environments in which the user would like to receive some or all cookies at a client device while filtering out some or all cookies in a different environment or on a different occasion, even though the user may or may not continue to employ a privacy proxy or privacy service in these different environments or upon these different occasions. For example, if a user only accesses a certain web site from the user's personal laptop and never from an office desktop, then the user may want to allow cookies through the privacy proxy server to the laptop; the laptop would tend to have the latest cookies stored in its cookie cache, which might be important for certain sites that are highly customized or individualized. In this example, the user's laptop would have recent cookies if the user decided to use the laptop without accessing the World Wide Web through the privacy proxy server.

With the present invention, the user is able to create different client profiles based on the user's needs, thereby giving the user a finer granularity of control over the cookie filtering functionality of a privacy proxy server or a privacy service. With the present invention, the user can customize the operation of the privacy proxy server or the privacy service on the basis of the device that the user is using, on the basis of the user's location, or on the basis of some other type of user-configured category. For example, the user might have client profiles based on a type of client device, such as laptop vs. desktop vs. PDA, or based on client location, such as office vs. mobile vs. home.

The present invention allows a user to configure a privacy proxy that is located between a client device that is being operated by the user and a server that is supporting resources that are being accessed by a user. The privacy proxy filters cookies that are returned by the server in accordance with user-configurable parameters.

It is important to note that while the present invention has been described in the context of a fully functioning data processing system, those of ordinary skill in the art will appreciate that the processes associated with the present invention are capable of being distributed in the form of instructions in a computer readable medium and a variety of other forms. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing at a proxy server data transmitted between a server and a client that is operated by a user, wherein the proxy server communicates with the client and the server through a network, the method comprising:
   receiving a set of parameters in a client message at the proxy server, wherein the set of parameters are configured by the user at the client;
   storing the set of parameters at the proxy server, wherein the parameters comprise a list of non-filtered domains and a list of filtered domains;
   receiving at the proxy server a response message from the server for the client;
   detecting at the proxy server a cookie associated with the response message;
   extracting from the response message a domain identifier associated with the server;
   retrieving the set of parameters; and
   processing the cookie at the proxy server in accordance with the retrieved set of parameters and the extracted domain identifier, wherein the processing step comprises:
      serving the response message from the proxy server to the client if the extracted domain identifier is on the list of non-filtered domains;
      if the extracted domain identifier is not on the list of non-filtered domains but is on the list of filtered domains, caching the cookie and forwarding a modified response message from the proxy server to the client; and
      if the extracted domain identifier is not on the list of non-filtered domains and is not on the list of filtered domains, prompting the user to enter a parameter for the extracted domain identifier, and adding that parameter to the set of parameters.

2. The method of claim 1 wherein after adding that parameter to the set of parameters, the processing step further comprises:
   sending the response message along with its associated cookie to the client.

3. The method of claim 1 further comprising:
   determining, prior to processing the cookie at the proxy server in accordance with the retrieved set of parameters and the extracted domain identifier, if the set of parameters contains an indication that the user has enabled cookie processing by the proxy server.

4. The method of claim 1 further comprising:
   managing multiple sets of parameters for the user at the proxy server, wherein each set of parameters is associated with an identifier; and
   selecting by the user a first identifier that is associated with the set of parameters prior to retrieving the set of parameters, wherein the set of parameters is retrieved in accordance with the selected first identifier.

5. The method of claim 4 wherein the first identifier is selecting during an authentication operation.

6. The method of claim 4 further comprising:
   selecting a second identifier; and
   processing the cookie at the proxy server in accordance with a set of parameters that is associated with the second identifier.

7. The method of claim 4 wherein identifiers that are associated with sets of parameters are chosen from a group comprising a type of client device or a client location.

8. An apparatus for processing at a proxy server data transmitted between a server and a client that is operated by a user, wherein the proxy server communicates with the client and the server through a network, the apparatus comprising:
   a processor;
   a computer memory holding computer program instructions which when executed by the processor perform a method comprising:
      receiving a set of parameters in a client message at the proxy server, wherein the set of parameters are configured by the user at the client;
      storing the set of parameters at the proxy server, wherein the parameters comprise a list of non-filtered domains and a list of filtered domains;
      receiving at the proxy server a response message from the server for the client;
      detecting at the proxy server a cookie associated with the response message;
      extracting from the response message a domain identifier associated with the server;
      retrieving the set of parameters; and
      processing the cookie at the proxy server in accordance with the retrieved set of parameters and the extracted domain identifier, wherein the processing step comprises:
         serving the response message from the proxy server to the client if the extracted domain identifier is on the list of non-filtered domains;
         if the extracted domain identifier is not on the list of non-filtered domains but is on the list of filtered domains, caching the cookie and forwarding a modified response message from the proxy server to the client; and
         if the extracted domain identifier is not on the list of non-filtered domains and is not on the list of filtered domains, prompting the user to enter a parameter for the extracted domain identifier, and adding that parameter to the set of parameters.

9. The apparatus of claim 8 wherein if the extracted domain identifier is not on the list of non-filtered domains but is on the list of filtered domains, the processing step of the method further comprises:
   blocking the cookie from transmission from the proxy server to the client.

10. The apparatus of claim 8 wherein after adding that parameter to the set of parameters, the processing step of the method further comprises:
  sending the response message along with its associated cookie to the client.

11. The apparatus of claim 8 wherein the method further comprises:
  determining, prior to processing the cookie at the proxy server in accordance with the retrieved set of parameters and the extracted domain identifier, if the set of parameters contains an indication that the user has enabled cookie processing by the proxy server.

12. The apparatus of claim 8 wherein the method further comprises:
  managing multiple sets of parameters for the user at the proxy server, wherein each set of parameters is associated with an identifier; and
  selecting by the user a first identifier that is associated with the set of parameters prior to retrieving the set of parameters, wherein the set of parameters is retrieved in accordance with the selected first identifier.

13. The apparatus of claim 12, wherein the first identifier is selecting during an authentication operation.

14. The apparatus of claim 12 wherein the method further comprises:
  selecting a second identifier; and
  processing the cookie at the proxy server in accordance with a set of parameters that is associated with the second identifier.

15. The apparatus of claim 12 wherein identifiers that are associated with sets of parameters are chosen from a group comprising a type of client device or a client location.

16. A computer program product in a non-transitory computer readable medium for use at a proxy server for processing data transmitted between a server and a client that is operated by a user, wherein the proxy server communicates with the client and the server through a network, the computer program product holding computer program instructions which when executed by the proxy server perform a method comprising:
  receiving a set of parameters in a client message at the proxy server, wherein the set of parameters are configured by the user at the client;
  storing the set of parameters at the proxy server, wherein the parameters comprise a list of non-filtered domains and a list of filtered domains;
  receiving at the proxy server a response message from the server for the client;
  detecting at the proxy server a cookie associated with the response message;
  extracting from the response message a domain identifier associated with the server;
  retrieving the set of parameters; and
  processing the cookie at the proxy server in accordance with the retrieved set of parameters and the extracted domain identifier, wherein the processing step comprises:
    serving the response message from the proxy server to the client if the extracted domain identifier is on the list of non-filtered domains;
    if the extracted domain identifier is not on the list of non-filtered domains but is on the list of filtered domains, caching the cookie and forwarding a modified response message from the proxy server to the client; and
    if the extracted domain identifier is not on the list of non-filtered domains and is not on the list of filtered domains, prompting the user to enter a parameter for the extracted domain identifier, and adding that parameter to the set of parameters.

17. The computer program product of claim 16 wherein if the extracted domain identifier is not on the list of non-filtered domains but is on the list of filtered domains, the processing step of the method further comprises:
  blocking the cookie from transmission from the proxy server to the client.

18. The computer program product of claim 16 wherein after adding that parameter to the set of parameters, the processing step of the method further comprises:
  sending the response message along with its associated cookie to the client.

19. The computer program product of claim 16 wherein the method further comprises:
  determining, prior to processing the cookie at the proxy server in accordance with the retrieved set of parameters and the extracted domain identifier, if the set of parameters contains an indication that the user has enabled cookie processing by the proxy server.

20. The computer program product of claim 16 wherein the method further comprises:
  managing multiple sets of parameters for the user at the proxy server, wherein each set of parameters is associated with an identifier; and
  selecting by the user a first identifier that is associated with the set of parameters prior to retrieving the set of parameters, wherein the set of parameters is retrieved in accordance with the selected first identifier.

21. The computer program product of claim 20 wherein the first identifier is selecting during an authentication operation.

22. The computer program product of claim 20 wherein the method further comprises:
  selecting a second identifier; and
  processing the cookie at the proxy server in accordance with a set of parameters that is associated with the second identifier.

23. The computer program product of claim 20 wherein identifiers that are associated with sets of parameters are chosen from a group comprising a type of client device or a client location.

24. The method of claim 1 wherein if the extracted domain identifier is not on the list of non-filtered domains but is on the list of filtered domains, the processing step further comprises:
  blocking the cookie from transmission from the proxy server to the client.

25. The method as described in claim 1 wherein the set of parameters comprise a first subset of parameters associated with a first profile associated with the user, and a second subset of parameters associated with the user.

26. The method as described in claim 1 wherein the step of retrieving the set of parameters retrieves the first subset of parameters or the second subset of parameters based on a configuration setting associated with the user.

* * * * *